United States Patent [19]

Schmid et al.

[11] Patent Number: 5,480,923
[45] Date of Patent: Jan. 2, 1996

[54] THERMOPLASTICALLY PROCESSIBLE COMPOSITION OF STARCH ACRYLATE COPOLYMERS

[75] Inventors: Eduard Schmid, Bonaduz; Friedrich S. Buehler, Thusis; Hans-Joachim Schultze, Chur, all of Switzerland

[73] Assignee: EMS-Inventa AG, Switzerland

[21] Appl. No.: 289,835

[22] Filed: Aug. 12, 1994

Related U.S. Application Data

[63] Continuation of Ser. No. 908,321, Jul. 2, 1992, abandoned.

[30] Foreign Application Priority Data

Jul. 4, 1991 [DE] Germany ............ 41 22 212.1

[51] Int. Cl.$^6$ .............. C08L 3/00; C08L 89/00; C08L 3/04
[52] U.S. Cl. ............... 524/47; 524/49; 524/51; 524/52; 524/53
[58] Field of Search .............. 524/47, 49, 51, 524/52, 53

[56] References Cited

U.S. PATENT DOCUMENTS 4,133,784 1/1979 Otey et al. .................. 260/17.4 ST
4,171,407 10/1979 Elser et al. ........................ 524/53

FOREIGN PATENT DOCUMENTS 118240 9/1984 European Pat. Off. .......... C08L 3/00
327505 8/1989 European Pat. Off. .......... C08L 3/02

OTHER PUBLICATIONS

Starch: Chemistry and Technology, Whistler, et al pp. 403–406 Academic Press, Inc. (1984).
Industrial Starch Technology, J. C. Johnson, pp. 108–110 Noyes Data Corp. (1979).

*Primary Examiner*—Paul R. Michl
*Assistant Examiner*—LaVonda R. DeWitt
*Attorney, Agent, or Firm*—Bierman and Muserlian

[57] ABSTRACT

A starch composition including destructurized starch, an acrylate copolymer having a molecular weight of more than 400,000, water, and additives such as plasticizers, lubricants, fillers, reinforcing agents, stabilizers, impact modifiers, and flame retardants. Also disclosed are a method of preparation thereof and articles produced therefrom. The compositions are readily usable on existing devices and can be thermoplastically processed substantially in accordance with methods currently in use.

49 Claims, No Drawings

THERMOPLASTICALLY PROCESSIBLE COMPOSITION OF STARCH ACRYLATE COPOLYMERS

This application is a continuation of application Ser. No. 07/908,321, filed Jul. 2, 1992, now abandoned.

This Application claims the benefit of the priority of German Application P 41 22 212.1, filed Jul. 4, 1991.

The invention relates to thermoplastically processible compositions comprising starch and extremely high molecular weight acrylic copolymers. Of particular relevance are homogeneous compositions of native or chemically modified starch. It further relates to a process for the preparation of compositions of this type, and to the use thereof for producing moldings and to the moldings themselves.

BACKGROUND OF THE INVENTION

Special process steps are necessary to make native starch sufficiently thermoplastically formable. In particular, native starch must be in the destructured form before being thermoplastically formed. For this purpose, in general, native starch having a water content of 5% to 18% by weight is extruded while being exposed to intense shear forces at 100° C. to 200° C. Plasticizers, such as polyhydroxy compounds; destructurizing agents, such as alkali metal salts, aqueous ammonia, urea, and urea derivatives; and mold release agents, such as metal stearates, are added to improve subsequent processing.

It is known that it is easier to obtain thermoplastic compositions from amylose-rich starches. In addition, starch compositions wherein the OH groups of the glucose units are reacted to a small extent (chemically modified), in particular ethoxylated or propoxylated, are easier to thermoplastically process. At the same time, they show improved long-term stability because the tendency of the amylose chains to retrograde is greatly reduced. Starch compositions of this type are described in DE-A 1,470,965; GB 965,349; and U.S. Pat. No. 3,117,014.

Methods in which a starch composition with a high water content is processed under elevated pressure are taught in EP 3 118 240 and EP A 327 505. The shrinkage, which can amount to up to 50%, is an extreme disadvantage in these cases. This main disadvantage is counteracted by addition of a foreign polymer such as polyethylene (PE), polystyrene (PS), and polyacetal, as well as olefinic copolymers such as ethylene acrylic acid (EAA) and ethylene vinyl acetate (EVA).

Further difficulties which occur despite observing the teachings of the state of the art in the preparation and processing of starch compositions, even if chemically modified or having a high amylose content, are substantial. Discoloration is often unavoidable; processing by injection molding is difficult because the unmolding is poor; the injection moldings have surface defects and are prone to adhesion, warping, and shrinkage. If the compositions are processed in an extruder, for example to form films, there is often a high surface roughness and tendency to adhesion.

The object therefore is to overcome the disadvantages of the state of the art by a destructured starch composition which can be prepared and thermoplastically processed straightforwardly and reliably. (Throughout the specification and claims, unless otherwise stated, all parts and percentages are by weight).

SUMMARY OF THE INVENTION

It has been found that a starch composition can be thermoplastically processed, thereby providing consumer articles of better appearance and increased usefulness, when it is a composition consisting of (a) destructurized starch, which can be wholly or partly chemically modified;

(b) 1–15%, based on the composition, of an acrylate copolymer with a molecular weight of more than 400,000;

(c) 2–15%, based on the composition, of total water; and (d) at least 5%, based on the composition, of customary additives for starch compositions; e.g. plasticizers and lubricants and, where appropriate, further additives for thermoplastic compositions such as fillers, reinforcing agents, stabilizers, impact modifiers, and flame retardants in, effective amounts.

In a preferred embodiment, the starch composition according to the invention consists of (a) 40–85 parts of starch;

(b) 1–15 parts of at least one acrylate copolymer, preferably with a molecular weight of 400,000 to 5,000,000;

(c) 2–15 parts of total water; and (d) 5–40 parts of other customary additives for starch, such as proteins and their alkali metal salts, plasticizers, lubricants, urea and urea derivatives.

Components (a) to (d) total 100 parts. In addition to the foregoing, (e) other substances customary for thermoplastic compositions of this type can be present.

DETAILED DESCRIPTION OF THE INVENTION

The composition according to the invention can consist of any desired starch type, but potato starch, wheat starch, rice starch, pea starch, and maize starch are preferred, and it can be native or chemically modified. However, it is currently recognized that compositions with a high content of branched polymer chains can be thermoplastically formed only poorly. This also applies to starch compositions in general and to the compositions according to the present invention.

Destructurized starch with an amylose content of less than 40 parts per 100 parts of starch are suitable for the production of simple injection moldings. However, higher amylose contents are preferred.

Processing is in every case simpler and results in higher quality injection moldings when the composition according to the invention contains component (b) in an amount of 1–15 parts, preferably 2 to 10 parts, particularly preferably 2 to 6 parts.

Where compositions are to be suitable for the production of 2-dimensional bodies such as blow molded films, flat films, composite films, and calendered films and, in particular, a deep drawing process is also intended to be possible, starches with an increased linear chain content are particularly suitable. Such starches contain at least 50%, preferably at least 65%, of amylose.

In this case to achieve an increased use period, i.e. to prevent retrogradation of the amylose chains, the starches can be chemically modified by substitution on the OH groups of the glucose. Degrees of substitution of 0.03 to 0.30, preferably 0.04 to 0.25, have proved particularly suitable in this case. The preferred substituents are

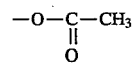

(1)

-continued

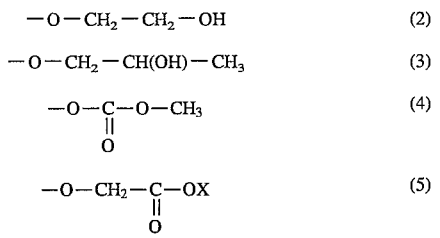

wherein X is hydrogen or a metal cation.

Component (b) of the thermoplastically processable composition is at least one acrylate copolymer (generally having no olefins as comonomers) with a molecular weight of more than 400,000, preferably more than 1 million, particularly preferably 1 to 5 million. Such extremely high molecular weights are, in general, obtained by emulsion polymerization in aqueous systems. The main component is usually methyl methacrylate, and the cocomponent, normally amounting in total to not more than 50 mol % of the acrylate, may advantageously be ethyl acrylate, butyl acrylate, butyl methacrylate, and/or 2-ethylhexyl acrylate. It is also possible to use as component (b) mixtures of acrylate copolymers, for example a purely random acrylate copolymer and a block copolymer. The class of these acrylate copolymers is described, for example, in the publication by ICI, Wilton, England, No. AG/20611/1 Ed/352/190, entitled Diakon APA.

Apart from the acrylate ester, which is usually present in random arrangement, the products can also contain blocks of other olefinic monomers such as styrene, acrylonitrile, ethylene, and propylene. These can amount to up to 40% of the polymer and usually form one of the chain ends. It is also possible to use as compound b) mixtures of acrylate copolymers, for example a purely random acrylate copolymer and a block copolymer.

It is believed that, as a consequence of (1) the polarity of the individual chain members, (2) their relative chain stiffness, (3) their high molecular weight, and (4) their excellent thermal stability, a strong shear effect is generated in the polymer melt being formed in the compounding process. This results in effective breakdown of the native starch grains wherein their structured polymer molecules having polar functional groups interact with the very long-chain acrylate copolymers and are removed from the original association.

At the same time, the heat of shearing is evenly distributed over the entire composition of the melt. The extrusion operation becomes more homogeneous and more uniform, which results in an extrudate of good quality with a pale intrinsic color when the process is carried out continuously, for example in a twin-screw compounder.

The fact that the combination of starch, extremely high molecular weight acrylate copolymer, starch-specific plasticizers, and processing aids results in a new type of thermoplastic composition is shown, in particular, by the examples and comparative examples in which the proccessability, quality of the test specimens, and mechanical properties differ essentially from so-called pure starch compositions, i.e. starch compositions without the essential additives.

The additives necessary for facilitating plasticization and processing of thermoplastically processible starch compositions have previously been described in many patents. For example, DE-A, 1,470,965; DE-A 2,552,126; GB-C 965, 349; U.S. Pat. No. 3,117,014; wherein amylose or amylose-rich starches were employed as the basic component in accordance with the state of the art at that time.

Employed as plasticizers are, in particular, polyhydroxy compounds, and as lubricants are, in particular, esters, amides, and salts of fatty acids.

Among the suitable customary additives to the inventive compositions are, depending on the application, fillers such as minerals, for example talc, kaolin, rock powder, ground wood powder, and $CaCO_3$, particularly sheet silicates; reinforcing agents, such as glass fibers, mineral fibers, organic fibers, e.g. cellulose fibers, polyamide fibers; and polyester fibers.

Suitable impact modifiers are core-shell polymers with a polar surface and, where appropriate, reactive groups; polymers having a melting or softening point below 170° C. and a molecular weight of 7000 to 400,000; olefinic copolymers with a glass transition temperature below 0° C., which contain polar chain members and, where appropriate, reactive groups of the acid anhydride, epoxide, and —NCO types. Suitable as flame retardants are substances which pollute the environment as little as possible, such as metal hydroxides, for example of aluminum and magnesium, and nitrogen compounds such as melamine or melamine cyanurate.

Preferred stabilizers are the commercially available types. Depending on the intended use it is also possible to combine these additives.

To produce the thermoplastically processible compositions of the invention, the starch (a), which is generally in its original granular form and has a water content of 5–20%, the high molecular weight acrylate copolymer (b), where appropriate additional water (c), the other additives, and, where appropriate, further additives are subjected, at temperatures of 100° C. to 200° C., to the action of shear forces until the composition is homogeneous. In this connection, the preparation of the compositions according to the invention takes place distinctly more favorably and under more constant production conditions compared to compositions composed of pure starch without the acrylate copolymer.

Particularly desirable is a process in which the components are metered, premixed or separately, into a heated kneading and/or extrusion device; melted at temperatures between 100° C. and 200° C., preferably between 140° C. and 180° C.; subsequently mixed and simultaneously subjected under the resulting pressure to intense shearing; optionally exposed to a vacuum; thereafter optionally exposed to an additional pressure build-up by transporting and/or retaining elements in the device; and then discharged as a single-phase homogenized and destructurized composition. The resulting composition can be shaped as such or, as desired, comminuted.

The process is preferably carried out continuously, for example in a twin-screw extruder such as a ZSK supplied by Werner and Pfleiderer, Stuttgart, or in a co-kneader supplied by Buss, Pratteln. In this connection it is possible for the solid starting materials to be fed in premixed form into the feed hopper of the extruder or continuously metered in the appropriate ratio. Since many polar liquid plasticizers such as ethylene glycol or glycerol are already soluble in native and/or chemically modified starch, they can be introduced into the starch powder even before the extrusion which takes place in, for example, a high-speed mixer. In this case, adequate free-flowing properties are generally retained.

However, the liquid constituents of the plasticizer can also be continuously metered into the melt being formed at a point downstream of the feed hopper, for example at the junction of the solid transport zone with the plasticization zone, in required amount. Selected additives can in this case be dissolved or suspended in the liquid plasticizer. The homogeneous composition according to the invention is produced with continuous kneading and transporting. Owing to the presence of water, and as a consequence of the closed design of the continuously operating apparatus described, considerable pressure is able to build up.

If desirable, it is possible to release the pressure over the composition before discharge from the extruder via a vacuum orifice in the extruder housing, in which case the application of additional vacuum is possible. A short conveying or transporting zone with renewed build-up of pressure is followed by discharge, for example through circular die orifices in strand form; the extrudate is then cooled and granulated.

For starch compositions in foamed form, corresponding vacuum orifices remain closed and, by suitable process parameters such as speed of the extruder, cross-sectional area of the die orifice, and water content, a pressure which is as high as possible is generated upstream of the die orifice, which results in a large pressure decrease in the die. Thus, a foamed composition is formed which can be used, for example as packing.

If the composition according to the invention is to contain other conventional additives (e) for thermoplastic compositions, the composition can be extruded again with the addition of these constituents, in which case additional plasticization and processing aids may be added where appropriate. If additives are required in small amounts, they can be introduced even to the initial mixture of the first extrusion step.

The process according to the invention is suitable for producing moldings, shapes of all kinds, such as fibers, films, injection moldings, and foam moldings. Shapes of these types produced according to the invention are (1) distinguished by a dry, non-adhesive surface; (2) show hardly any discoloration; and (3) have mechanically considerably better and more consistent properties, when compared with the known state of the art.

The invention is illustrated in more detail by means of examples and comparative examples. The percentage data for constituents is based on the total mass unless otherwise indicated. The starches used, some of which are commercially obtainable, some of which are special products, are employed without preliminary drying with their native water content of about 7%.

Preliminary tests confirm that a shear profile which is as high as possible is necessary to obtain a homogeneous composition and that use of a single-screw extruder often does not suffice. Devices with the necessary shear effect are, for example, co-rotating twin screw extruders with effective kneading blocks, for example the so-called ZSK types from Werner+Pfleiderer, Stuttgart or the co-kneader supplied by Buss, Pratteln. For most of the experiments, the twin-screw extruder made by Werner+Pfleiderer is employed, preferably of the type of ZSK-30 with a pair of screws as is customary for polyamide compounding.

The following additional units are used in the examples where required:

2 metering belt weighers for measuring the solids (starch powder, acrylate copolymer, solid plasticizers, fillers, etc. into the feed hopper;

1 liquid metering unit for liquid additives such as plasticizers and/or additional water at the end of the feed zone;

1 (degassing) connector in the conveying zone after the actual destructurization of the melt and before the last compression zone leading to the die orifice; and 1 die having an orifice with a preferred diameter of 3 mm to discharge the melt extrudate.

The compositions of the examples and of the comparative examples are prepared continuously. This entails the starting materials being fed continuously to the twin-screw extruder, and the resulting composition being discharged as extrudate; the latter is cooled by air impingement and granulated. Depending on the water content and temperature of the mixture, a vacuum is applied upstream of the die and varied so that a substantially bubble-free extrudate results. The resulting granulates are stored temporarily in a closed vessel. A machine of the Arburg Allrounder type 320-210-750 can be used for injection molding.

For the compounding and subsequent processing tests, mixtures of native and/or chemically modified starch with polyhydroxy compounds such as ethylene glycol, polyethylene glycol, glycerol, and sorbitol, together with, where appropriate, urea and small amounts of mold release agents such as metal stearate and stearyl stearate, are processed in the ZSK-30. The melt processing temperatures are 100° to 160°, in particular about 140° C., and the screws are rotated at a speed of 100 rpm to give a homogeneous composition, which is discharged as the extrudate, cooled, and granulated. The throughput is normally between 6 and 10 kg/h, preferably 8 kg/h.

Mixtures with and without addition of acrylate copolymer are compounded. Some mixtures in which the acrylate copolymer is added only during a second extrusion passage are also prepared. In some cases, further mixing components such as low-melting, polar thermoplastics were added at this extrusion passage.

In all tests with a high molecular weight acrylate copolymer content (b), the preparation of the inventive compositions from the starch and additives takes place considerably more favorably than in the comparative tests without component (b). Specifically, the operating data of the extruder remains much more constant. Thus, the torque hardly varies, whereas the variations occurring with a comparable formulation without addition of (b) are so great that, in some cases, the torque limit was exceeded. Moreover, the extrudates had smooth surfaces and there was virtually no discoloration.

By contrast, extrudates without addition of (b) often had rough—and in some cases also blistered—surfaces with discoloration to yellow/brownish/grey. It is thus possible effectively to reduce discolorations in an unexpected manner by addition of acrylate copolymer. The effect is concentration-dependent, usually discoloration is under normal production conditions, no longer visible when there is more than 4% of (b) present.

The compositions according to the invention composed of starch, acrylate copolymer and additives also have considerable advantages in subsequent processing compared to starch compositions prepared without (b). In particular, (1) remelting is easier and takes place under more constant conditions; (2) when molding by injection or extrusion, the demolding of the composition is simpler; (3) adhesion in the mold or to take-off rolls, for example in the production of flat films, no longer occurs or is substantially reduced; (4) the molding compositions have a distinctly improved surface because the starch is homogeneously destructurized; (5) discoloration occurs only slightly if at all; and (6) the dimensional stability is distinctly improved and the shrinkage of moldings is materially reduced.

The appearance and properties of the moldings are definitely better when (b) is used. Thus, injection moldings or films have a distinctly drier hand whereas films without (b) readily stick at high humidity. In the mechanical measurements, test specimens with (b) display better and more constant values than those without (b).

It is thus evident that the thermoplastically processible compositions according to the invention can be prepared more easily under more constant conditions, can be processed better and have a better performance profile, than compositions which contain no high molecular weight acrylate copolymer. The nature of the acrylate copolymer and optimal amount contained can be determined by simple tests based on the type of starch and intended additives, additive concentrations, and additions.

It has moreover appeared that high molecular weight acrylate copolymers with a random structure result in effective destructurization of the starch grains under the action of shear and yield homogeneous compositions; whereas use or co-use of block copolymers with one block composed of homopolymer (e.g. polystyrene) additionally improves demolding during processing, and specifically protects the composition effectively from discoloration. Hence, in some examples, a combination of pure acrylate copolymer and acrylate copolymer with a homopolymer block, for example composed of polystyrene, is employed.

| | |
|---|---|
| Starch 1 | corn starch with an amylose content of 60%. |
| Starch 2 | propoxylated corn starch, degree of substitution 0.05, with an amylose content of 60%. |
| Starch 3 | corn starch, amylose content 70%. |
| Starch 4 | propoxylated corn starch, degree of substitution 0.13, with an amylose content of 70%. |
| Starch 5 | carboxymethylated potato starch. |
| WM 1 | ethylene glycol. |
| WM 2 | glycerol. |
| WM 3 | sorbitol. |
| WM 4 | triethylene glycol. |
| ACP-1 | random acrylate copolymer with a molecular weight of more than 2 million, composed of 80% methyl methacrylate, 13% ethyl acrylate and 7% butyl methacrylate. |
| ACP-2 | acrylate copolymer with a molecular weight of about 1 million and 35% of a polystyrene end block and, randomly distributed, 40% methyl methylacrylate and 25% butyl acrylate. |
| ACP 3 | random acrylate copolymer with a molecular weight of more than 1 million, and composed of 90% methyl methacrylate and 10% butyl acrylate. |

The comparative examples are identified by VV in the Tables and descriptions which follow.

Preparation in a ZSK-30 was carried out in accordance with the general description of the process. No figures for the mechanical properties have been given because these depend very greatly on the particular humidity. When values were determined at the same time and there were found to be clear differences between the tests, this is noted by the symbols in the Tables.

In Examples 1–3, the same undried Starch 2 is processed to granules in the ZSK with addition of the polyhydroxy compounds WM 2 and WM 3 and, in some cases, magnesium stearate. The torque and the material pressure remain exceptionally constant, and the resulting extrudate is readily granulated and has a smooth surface. Processing results in injection moldings with a pale intrinsic color, having almost smooth surfaces and showing very little shrinkage.

In contrast to this, preparation of the comparative materials VV 4 and VV 5 is very much more difficult. In particular, the torque, and thus also the material pressure in the ZSK, varies greatly and extrudate fractures occur. Test specimens are produced from these comparative compositions and show distinct warpage and shrinkage, their surface is rougher and shows distinct discoloration.

The examples and comparative examples show the advantages of the use of high molecular weight acrylate in the preparation of compositions according to the invention. They also show that the injection molding process produces moldings of distinctly greater usefulness.

To compare the compositions according to the invention with starch compositions which contain no high molecular weight acrylate copolymer, a larger amount of granules was prepared in Comparative Example VV 6 under the conditions of Comparative Example VV 4. The basic formulation for this comparison is Starch 2 with 15% WM 2, 13% WM 3, and 2% urea.

In each case, 9% of different high molecular weight acrylate copolymers and 1% magnesium stearate are incorporated into this composition under extrusion conditions as in Examples 1–3. The high molecular weight acrylate copolymers are ACP-1, -2, and -3, and the commercial types are PA-20 and PA-100 (acrylic processing acids) supplied by Kaneka, Belgium. In addition, one variant with 4.5% of each ACP-1 and ACP-2 was prepared (Example 11). DIN tensile specimens were injection molded from these compositions and from Comparative Example VV 6 at melt temperatures of 138° C. and mold temperatures of 20° C. All the compositions according to the invention resulted in tensile specimens with a pale intrinsic color and distinctly reduced shrinkage.

To examine the dependence of the proccessability and properties on the amount of high molecular weight copolymers added, 9%, 4%, 2%, and 1% ACP-2 are incorporated in material from Test Example 6 under the conditions of Example 1–3, and DIN tensile specimens are injection molded from the resulting granules.

It was determined from this that there is a clear dependence on the concentration of the ACP-2 added, both in the constancy of the torque in the ZSK and in the quality of the test specimens concerning, for example, discoloration, surface smoothness, and shrinkage. It also develops, surprisingly, that moldings based on the composition with only 1% ACP-2 have distinct quality advantages compared with compositions without ACP-2. Thus, they have a paler intrinsic color and have a better surface quality.

In Examples 7 and 10 and Comparative Examples VV 8 and VV 9 in Table 2, as customary additions to starch, WM 2 is combined with urea and magnesium stearate. In Example 7 and 10, 2% ACP-2 is included in each case. The processing by injection molding of the compositions according to Examples 7 and 10 to give DIN tensile specimens according to the conditions of Examples 1–3 results in more dimensionally stable test specimens with better surface smoothness than with Comparative Examples VV 8 and VV 9. This also confirms that even small amounts of ACP contribute improved properties to the preparation of the compositions according to the invention.

For stiff molding compositions, granules from Comparative Examples VV 6, i.e. without component (b), and granules containing 4% ACP-1, are mixed with a masterbatch of 60% glass fiber in polycaprolactone and directly injection molded to give DIN tensile specimens. Evaluation of the moldings shows that the use of the compositions according to the invention results in a distinctly better surface quality.

In further tests, compositions composed of Starch 2, containing 10% of Starch 5, 18% of WM 4, 0.5% of urea, and 0.2% of magnesium stearate are prepared. Also included are ACP-2 and ACP-3 in amounts of 1% and 2%, respectively. All products are prepared under very constant preparation conditions in the ZSK-30 and are injection molded to extremely dimensionally stable test specimens.

Further tests were carried out to determine whether it is possible, starting from non-destructurized starch containing a polyamide derived from hexamethylenediamine and dimerized fatty acid with 36 carbon atoms, an acrylate copolymer, and additives customary for starch, to prepare compositions according to the invention directly by the process described. For this, 10% to 25% of the polyamide was added to the mixture of Starch 2 along with 15% of each of plasticizers WM2 and 3. The tests were carried out with and without addition of acrylate copolymer ACP-1.

Whereas extrusion in the ZSK-30 is difficult when no acrylate copolymer was used, it takes place distinctly better when 5% ACP-1 was added. The subsequent processing by injection molding also takes place more straightforwardly and results in moldings of greater usefulness when ACP-1 is also present. This is also true for unmodified starch such as starches 1, 3, and 4.

To produce flat films, granules are prepared by the process according to the invention. They are composed of 70% Starch 2, and 15% each of WM 2 and WM 3; they are melted in a Göttfert Extrusometer with a screw diameter of 20 mm and discharged through a flat-film die at a melt temperature of 165° C. as a film about 50μ thick over a polishing calendar with variable roll temperature. Strong adhesion to the rolls was found at temperatures above 70° C. The subsequently wound-up film adhered to itself on slow cooling so that it was useless.

For this reason, subsequently a mixture of 3 parts of ACP-1 and 2 parts of ACP-2 were incorporated at 5% by weight into the previously used composition, and this new composition was processed to a film under the same conditions. As a test, the temperature of the take-off rolls was increased stepwise. The composition adhered to the rolls only above 120° C.; the film was therefore taken off at a roll temperature of 110° C., and effective smoothing of the surface was achieved. There was no adhesion after winding up. The film can be taken off and used for packaging purposes. Flat films with a thickness of about 300μ are produced from the same material in the same way and are amenable to deep drawing after reheating.

While only a limited number of specific embodiments of the present invention have been expressly disclosed, it is, nonetheless, to be broadly construed and not to be limited except by the character of the claims appended hereto.

TABLE 1

| Test | 1 | 2 | 3 | VV 4 | VV 5 |
|---|---|---|---|---|---|
| FORMULATION | | | | | |
| Starch 2 | 68 | 67 | 66 | 72 | 70 |
| Water content 7% | | | | | |
| ACP-1 | 2 | 2 | | | |
| ACP-2 | 3 | 3 | 3 | | |
| Diakon APA 3 | | | 3 | | |
| Urea | | | | | 2 |
| WM 2 | 14 | 14 | 14 | 15 | 15 |
| WM 3 | 13 | 13 | 13 | 13 | 12 |
| Mg Stearate | — | 1 | 1 | | 1 |
| PRODUCTION CONDITION in ZSK-30 | | | | | |
| Melt temperature °C. | 137 | 143 | 142 | 140–150 | 140–150 |
| Torque, % of max., rel. scale | 82 | 83 | 84 | 80–100 | 80–100 |
| Vacuum, atm | −0.4 | −0.4 | −0.4 | −0.4 | −0.4 |
| Material pressure, bar | 41 | 40 | 42 | 20–30 | 30–50 |
| Assessment of extrudates/granules | + | + | + | − | o |
| INJECTION MOLDING | | | | | |
| T composition °C. | 138 | 138 | 138 | 138 | 138 |
| T mold °C. | 20 | 20 | 20 | 20 | 20 |
| Demoldability | o | o | o | o | o |
| Surface | + | ++ | ++ | − | o |
| Shrinkage | o | + | + | − | o |
| Mechanical values | + | + | + | o | o |
| Intrinsic | o | + | + | − | o |

Diakon APA-3 = proprietary product of ICI, England
++ = excellent
+ = good
o = moderate
− = poor
—— = very poor

TABLE 2

| Test | 7 | VV 8 | VV 9 | 10 |
|---|---|---|---|---|
| FORMULATION | | | | |
| Starch 2 | 77.5 | 79.3 | 78.8 | 76.8 |
| WM 2 | 20.0 | 20.0 | 20.0 | 20.0 |
| ACP 2 | 2.0 | | | 2.0 |
| Urea | 0.5 | 0.5 | 1.0 | 1.0 |
| Mg stearate | 0.2 | 0.2 | 0.2 | 0.2 |
| PRODUCTION CONDITION in ZSK-30 | | | | |
| Melt temperature °C. | 138 | 139 | 139 | 138 |
| Torque, arb. scale, % of max. | 80 | 90 | 80 | 75 |
| Vacuum yes/no = +/− | + | + | + | + |

TABLE 2-continued

| Test | 7 | VV 8 | VV 9 | 10 |
|---|---|---|---|---|
| Material pressure, bar | 75 | 75 | 75 | 75 |
| INJECTION MOLDING | | | | |
| Demoldability | o | o | o | o |
| Surface | + | − | − | + |
| Shrinkage | o | o | o | o |

+ = good
− = poor

What we claim is:

1. A thermoplastically processible melt composition comprising as melt components,
   (a) destructurized, at least partly chemically modified, starch;
   (b) 1% to 15%, based on (a) and (b), of at least one acrylate copolymer having a molecular weight of more than 400,000;
   (c) 2% to 15%, based on (a) to (d), of total water; and
   (d) at least 5%, based on (a) to (d), of an additive taken from the class consisting of plasticizers and lubricants.

2. The composition of claim 1 wherein said starch has an amylose content of more than 50%.

3. The composition of claim 2 wherein said amylose content is more than 65%.

4. The composition of claim 1 wherein there is 6 to 15 parts of water present.

5. The composition of claim 1 wherein said starch is selected from the group consisting of potato, maize, and pea starches.

6. The composition of claim 1 wherein said starch is modified to a degree of substitution of 0.04 to 0.25.

7. The composition of claim 1 wherein said acrylate copolymer is selected from the group consisting of esters of acrylic and/or methacrylic acid with alcohols, said alcohols having 1 to 10 carbon atoms.

8. The composition of claim 7 wherein said alcohols are selected from the group consisting of methyl, ethyl, propyl, butyl, 2-ethylhexyl alcohols and mixtures thereof.

9. The composition of claim 8 wherein said esters have a methyl ester content of more than 50 mol %.

10. The composition of claim 1 wherein said acrylate copolymer in (b) is present in an amount of 2 to 10 parts.

11. The composition of claim 1 wherein said acrylate copolymer in (b) is present in an amount of 2 to 6 parts.

12. The composition of claim 1 wherein said plasticizers are polyhydroxy compounds and said lubricants are selected from the group consisting of esters, amides, and salts of fatty acids.

13. Formed shapes selected from the group consisting of foamed and unfoamed articles, fibers, and films which are made of the melt composition of claim 1.

14. The composition of claim 1 wherein said starch is modified to a degree of substitution of 0.03 to 0.30.

15. A process for the preparation of the melt composition of claim 1 comprising subjecting, as melt components,
   (a) said starch;
   (b) 1% to 15%, based on (a) and (b), of an acrylate copolymer having a molecular weight exceeding 400,000;
   (c) 2% to 15%, based on (a) to (d), of total water;
   (d) at least 5%, based on (a) to (d), of plasticizers and lubricants;
to shear forces at a shear temperature of 100° C. to 200° C., their exposing said melt components to a vacuum.

16. A thermoplastically processible melt composition comprising at least partly chemically modified starch and acrylate copolymers wherein, as melt components, there are
   (a) 40 to 85 parts of said starch;
   (b) 1 to 15 parts of at least one said acrylate copolymer, having a molecular weight of at least 400,000;
   (c) 2 to 15 parts of total water; and
   (d) 5 to 40 parts of at least one additive selected from the group consisting of plasticizers, lubricants, urea and urea derivatives, proteins and their alkali metal salts;
wherein components (a) to (d) total 100 parts.

17. The composition of claim 16 wherein said starch is selected from the group consisting of potato, maize, and pea starches.

18. The composition of claim 16 wherein said starch is modified to a degree of substitution of 0.04 to 0.25.

19. The composition of claim 16 wherein said acrylate copolymer is selected from the group consisting of esters of acrylic and/or methacrylic acid with alcohols, said alcohols having 1 to 10 carbon atoms.

20. The composition of claim 19 wherein said alcohols are selected from the group consisting of methyl, ethyl, propyl, butyl, 2-ethylhexyl alcohols and mixtures thereof.

21. The composition of claim 20 wherein said esters have a methyl ester content of more than 50 mol %.

22. The composition of claim 16 wherein said acrylate copolymer in (b) is present in an amount of 2 to 10 parts.

23. The composition of claim 16 wherein said acrylate copolymer in (b) is present in an amount of 2 to 6 parts.

24. The composition of claim 16 wherein said plasticizers are polyhydroxy compounds and said lubricants are selected from the group consisting of esters, amides, and salts of fatty acids.

25. The composition of claim 16 wherein there are further additives present which are selected from the group consisting of fillers, reinforcing agents, stabilizers, flame retardants, and impact modifiers.

26. Formed shapes selected from the group consisting of foamed and unfoamed articles, fibers, and films which are made of the melt composition of claim 16.

27. The composition of claim 16 wherein said starch is at least 50% amylose.

28. The composition of claim 27 wherein said starch is at least 65% amylose.

29. The composition of claim 4 wherein there is 6 to 15 parts of water present.

30. The composition of claim 16 wherein said starch is modified to a degree of substitution of 0.03 to 0.30.

31. A process for the preparation of the melt composition of claim 1 comprising subjecting, as melt components,
   (a) destructurized, at least partly chemically modified starch;
   (b) 1% to 15%, based on (a) and (b), of an acrylate copolymer having a molecular weight exceeding 400,000;
   (c) 2% to 15%, based on (a) to (d), of total water;
   (d) at least 5%, based on (a) to (d), of plasticizers and lubricants;

to shear forces at a shear temperature of 100° C. to 200° C.

32. The process of claim 31 wherein said melt components are metered into a heated kneading and/or extrusion device, melted at a melt temperature of 100° C. to 200° C. mixed and subjected to shearing forces under a first pressure, discharged as a homogenized and destructurized composition, and shaped or comminuted.

33. The process of claim 32 wherein said melt temperature is 140° C. to 180° C.

34. The process of claim 32 carried out in a continuously operating kneader, wherein the composition is maintained under pressure during the action of said shear forces and is subsequently extruded continuously through at least one die orifice, and is thereafter comminuted.

35. The process of claim 32 wherein at least some of said melt components are solid components and at least some of said melt components are liquid components, said process comprising introduction of said destructurized starch and said acrylate copolymer into a receiving chamber of said extrusion device, thereby forming a mixture, said extrusion device conveying said mixture in a downstream direction into a feed zone, charging said liquid components, and any other solid components dissolved or suspended therein, into said feed zone to form a blend, heating said blend to 100° C. to 200° C., subjecting said blend to said shear forces to form a homogeneous composition, and then releasing said pressure, thereafter subjecting said blend to a vacuum whereby volatiles are removed, then building up a second pressure in an extrusion zone downstream of said feed zone, and extruding said melt composition.

36. The process of claim 35 wherein at least a portion of said plasticizers is a solid component and is premixed with said destructurized starch and said acrylate copolymer before said introduction.

37. The process of claim 35 wherein at least a portion of said plasticizers is a solid component and said destructurized starch, said acrylate copolymer, and said plasticizers are separately introduced into said receiving chamber.

38. The process of claim 35 wherein said extruded melt composition is cooled and comminuted.

39. The process of claim 35 wherein said melt composition is discharged in foam form with said second pressure at least partly released.

40. A thermoplastically processible melt composition comprising as melt components,
   (a) at least partially chemically modified, destructurized starch;
   (b) 1% to 15%, based on (a) and (b), of at least one acrylate copolymer having a molecular weight of more than 400,000;
   (c) 2% to 15%, based on (a) to (d), of total water; and
   (d) at least 5%, based on (a) to (d), of plasticizers and lubricants,
wherein said acrylate copolymer comprises up to 40% of other unsaturated monomers.

41. The composition of claim 40 wherein said other unsaturated monomers are selected from the group consisting of styrene, alkylated styrene, and acrylonitrile.

42. The composition of claim 40 wherein said other unsaturated monomers are in block form.

43. The composition of claim 40 wherein said other unsaturated monomers are in block form.

44. The composition of claim 42 wherein said unsaturated monomers are terminal to chains of said acrylate copolymer.

45. The composition of claim 43 wherein said unsaturated monomers are terminal to chains of said acrylate copolymer.

46. A thermoplastically processible melt composition comprising at least partially chemically modified, destructurized starch and acrylate copolymers wherein, as melt components, there are
   (a) 40 to 85 parts of said starch;
   (b) 1 to 15 parts of at least one said acrylate copolymer, having a molecular weight of at least 400,000, said copolymer comprising up to 40% of other unsaturated monomers;
   (c) 2 to 15 parts of total water; and
   (d) 5 to 40 parts of at least one additive selected from the group consisting of plasticizers, lubricants, urea and urea derivatives, proteins and their alkali metal salts;
wherein components (a) to (d) total 100 parts.

47. The composition of claim 46 wherein said other unsaturated monomers are selected from the group consisting of styrene, alkylated styrene, and acrylonitrile.

48. A thermoplastically processible melt composition comprising as melt components,
   (a) at least partially chemically modified, destructurized starch;
   (b) 1% to 15%, based on (a) and (b), of at least one acrylate copolymer having a molecular weight of 1 to 5 million,
   (c) 2% to 15%, based on (a) to (d), of total water; and
   (d) at least 5%, based on (a) to (d), of plasticizers and lubricants.

49. A thermoplastically processible melt composition comprising at least partially chemically modified, destructurized starch and acrylate copolymers wherein, as melt components, there are
   (a) 40 to 85 parts of said starch;
   (b) 1 to 15 parts of at least one said acrylate copolymer having a molecular weight of 1 to 5 million,
   (c) 2 to 15 parts of total water; and water; and
   (d) 5 to 40 parts of at least one additive selected from the group consisting of plasticizers, lubricants, urea and urea derivatives, proteins and their alkali metal salts;
wherein components (a) to (d) total 100 parts.

* * * * *